US008562143B2

(12) United States Patent
Miyazaki

(10) Patent No.: US 8,562,143 B2
(45) Date of Patent: Oct. 22, 2013

(54) PROJECTION DISPLAY DEVICE WITH COOLING UNIT

(75) Inventor: Kenji Miyazaki, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 319 days.

(21) Appl. No.: 12/585,251

(22) Filed: Sep. 9, 2009

(65) Prior Publication Data

US 2010/0066979 A1    Mar. 18, 2010

(30) Foreign Application Priority Data

Feb. 28, 2007    (JP) ................................. 2007-049358

(51) Int. Cl.
*G03B 21/14*    (2006.01)
*G03B 21/18*    (2006.01)
*G03B 21/22*    (2006.01)
*G03B 21/26*    (2006.01)
*F21V 29/00*    (2006.01)

(52) U.S. Cl.
USPC ................. 353/57; 353/58; 353/94; 353/119; 362/294

(58) Field of Classification Search
USPC ......... 353/52, 57–58, 60–61, 94, 119, 54–55; 362/264, 294; 349/5, 7–8, 161
See application file for complete search history.

(56) References Cited

U.S. PATENT DOCUMENTS

| | | | |
|---|---|---|---|
| 6,882,480 B2 * | 4/2005 | Yanagisawa | 359/634 |
| 6,935,753 B2 * | 8/2005 | Takezawa et al. | 353/119 |
| 6,966,653 B2 | 11/2005 | Kitabayashi | |
| 7,325,957 B2 * | 2/2008 | Morejon et al. | 362/555 |
| 7,535,543 B2 * | 5/2009 | Dewa et al. | 349/161 |
| 7,866,827 B2 * | 1/2011 | Egawa et al. | 353/54 |
| 2004/0257491 A1 | 12/2004 | Kitabayashi | |
| 2005/0117077 A1 * | 6/2005 | Utsunomiya | 349/5 |
| 2006/0145949 A1 | 7/2006 | Hirai et al. | |
| 2006/0279706 A1 * | 12/2006 | Bash et al. | 353/54 |
| 2010/0097783 A1 * | 4/2010 | Gomi | 362/97.1 |

FOREIGN PATENT DOCUMENTS

| | | | |
|---|---|---|---|
| JP | 07090582 A | * | 4/1995 |
| JP | 8-201916 A | | 8/1996 |
| JP | 2000-039670 A | | 2/2000 |
| JP | 2004-170703 A | | 6/2004 |

(Continued)

OTHER PUBLICATIONS

Japanese Office Action dated Jan. 4, 2012, with partial English translation.

*Primary Examiner* — Tony Ko
*Assistant Examiner* — Jori S Reilly-Diakun
(74) *Attorney, Agent, or Firm* — McGinn IP Law Group, PLLC

(57) ABSTRACT

A projection display device that modulates light on the basis of image information to form an optical image, and that projects the formed optical image, includes: light source devices 10R, 10G and 10B; optical modulation device 50 that modulates lights emitted from light source devices 10R, 10G and 10B; and common metal plate 70 on which light source devices 10R, 10G and 10B and optical modulation device 50 are mounted, light source devices 10R, 10G and 10B and optical modulation device 50 being thermally connected via metal plate 70.

15 Claims, 5 Drawing Sheets

(56) References Cited

FOREIGN PATENT DOCUMENTS

| JP | 2004-279441 A | 10/2004 |
|---|---|---|
| JP | 2004-354853 A | 12/2004 |
| JP | 2005-74076 A | 3/2005 |
| JP | 2006-154460 A | 6/2006 |
| JP | 2006-178350 A | 7/2006 |
| JP | 2008-145486 | 6/2008 |
| WO | WO 02/056110 A1 | 7/2002 |

* cited by examiner

PROJECTION DISPLAY DEVICE WITH COOLING UNIT

BACKGROUND OF THE INVENTION

1. Field of the Invention The present invention relates to a projection display device that modulates light on the basis of image information to form an optical image, and projects the formed optical image.

2. Description of the Related Art

A projection display device includes at least a light source, and an optical modulator that modulates light emitted from the light source to form an optical image. As a general light source of a projection display device, a discharge lamp such as a metal halide lamp, a xenon lamp, or a high-pressure mercury lamp is used. In recent years, a projection display device that uses a light emitting element such as a light emitting diode or a semiconductor laser as a light source has also been developed. Meanwhile, as a general optical modulator of a projection display device, a liquid crystal panel or a DMD (Digital Micro-mirror Device) is used.

To increase brightness of a projected optical image, an optical modulator needs to be illuminated by a brighter light. For the optical modulator to be illuminated by a brighter light, an power of a light source needs to be increased. To increase the power of the light source, when the light source is a discharge lamp, electric power input to the discharge lamp needs to be increased. Also, when the light source is a light emitting element, a drive current of the light emitting element needs to be increased. However, when the power of the light source is increased, a heating value is increased to overheat the light source, causing various problems. For example, the amount of light emitted by the light emitting element changes according to the operating temperature. Generally, the amount of light emitted by the light emitting element decreases with the increasing operating temperature. Also, when heat generated from the light source increases temperature in a casing of a projection display device, operation of an optical element or an electric element other than the light source becomes unstable or life of the element is shortened.

For a liquid crystal panel or a DMD that is an optical modulator, an operating temperature range is set. When an operating temperature exceeds a predetermined temperature range, operation of the liquid crystal panel or the DMD becomes unstable or impossible. When heat generated from the light source increases the temperature in the casing of the projection display device, the temperature of the optical modulator also increases, but the main heat source for increasing the temperature of the optical modulator is the light applied to the modulator. Specifically, a part of the light emitted from the light source and applied to the optical modulator is converted into heat, and the heat increases the temperature of the optical modulator. Thus, an increase in the power of the light source increases the temperature of the optical modulator.

Thus, various techniques for cooling a light source or for cooling an optical modulator have been developed. Japanese Patent Laid-Open No. 2005-74076 describes an example of a technique for cooling a light source. Japanese Patent Laid-Open No. 2004-354853 describes an example of a technique for cooling an optical modulator. Further, Japanese Patent Laid-Open No. 2006-154460 describes a projection display device including a temperature sensor, and a cooling fan controlled on the basis of the temperature measured by the temperature sensor.

In short, in the field of a projection display device, an efficient manner of cooling a light source and an optical modulator is one of the important subjects in development of the device.

However, with the widespread use of projection display devices, projection display devices have been used in various environments. Thus, the temperature of the optical modulator may become lower than the operating temperature range depending on environmental temperature. For example, when the projection display device is used outdoors in winter or at high altitudes, the temperature of the optical modulator may become lower than the operating temperature range.

When the temperature of the optical modulator becomes lower than the operating temperature range, operation becomes unstable or impossible such as when the temperature becomes higher than the operating temperature range.

SUMMARY OF THE INVENTION

An aspect of the present invention provides a projection display device that modulates light on the basis of image information to form an optical image, and projects the formed optical image. The projection display device includes: a light source; an optical modulator that modulates light emitted from the light source; and a common support member on which the light source and the optical modulator are mounted, wherein the light source and the optical modulator are thermally connected via the support member.

Another aspect of the present invention provides a projection display device that modulates light on the basis of image information to form an optical image, and projects the formed optical image. The projection display device includes: a light source; an optical modulator that modulates light emitted from the light source; cooling means for cooling the light source; a first temperature sensor that measures the temperature of the light source; a second temperature sensor that measures the temperature of the optical modulator; a controller that controls the cooling means; and a common support member on which at least the light source and the optical modulator are mounted. The light source and the optical modulator are thermally connected via the support member, and the controller stops the cooling means when the temperature of the optical modulator measured by the second temperature sensor becomes lower than a reference temperature.

An object of the present invention is to provide a projection display device that can stably operate in environments where the temperature of an optical modulator becomes lower than the operating temperature range.

The above and other objects, features and advantage of the present invention will become apparent from the following description with reference to the accompanying drawings which illustrate examples of the present invention.

DETAILED DESCRIPTION OF THE PREFERRED EMBODIMENTS

Figure 1:
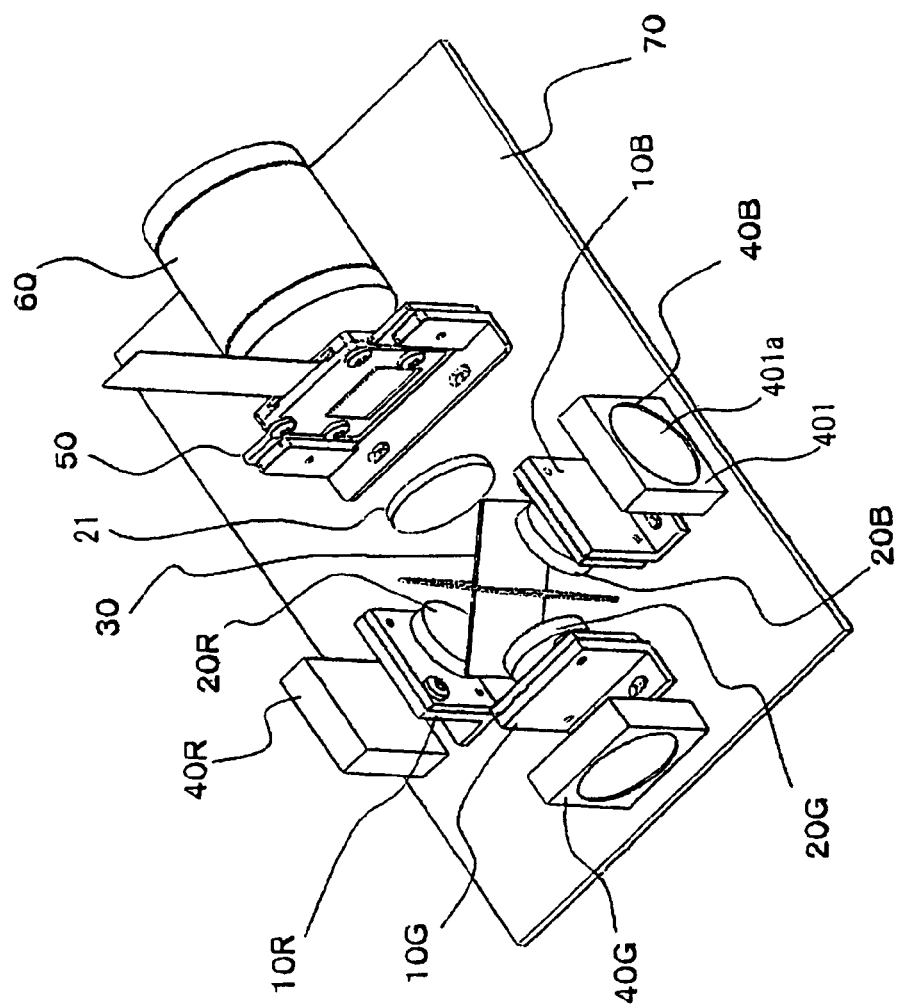
FIG. 1 is a schematic perspective view of an optical unit included in a projection display device of the present invention.
Figure 2:
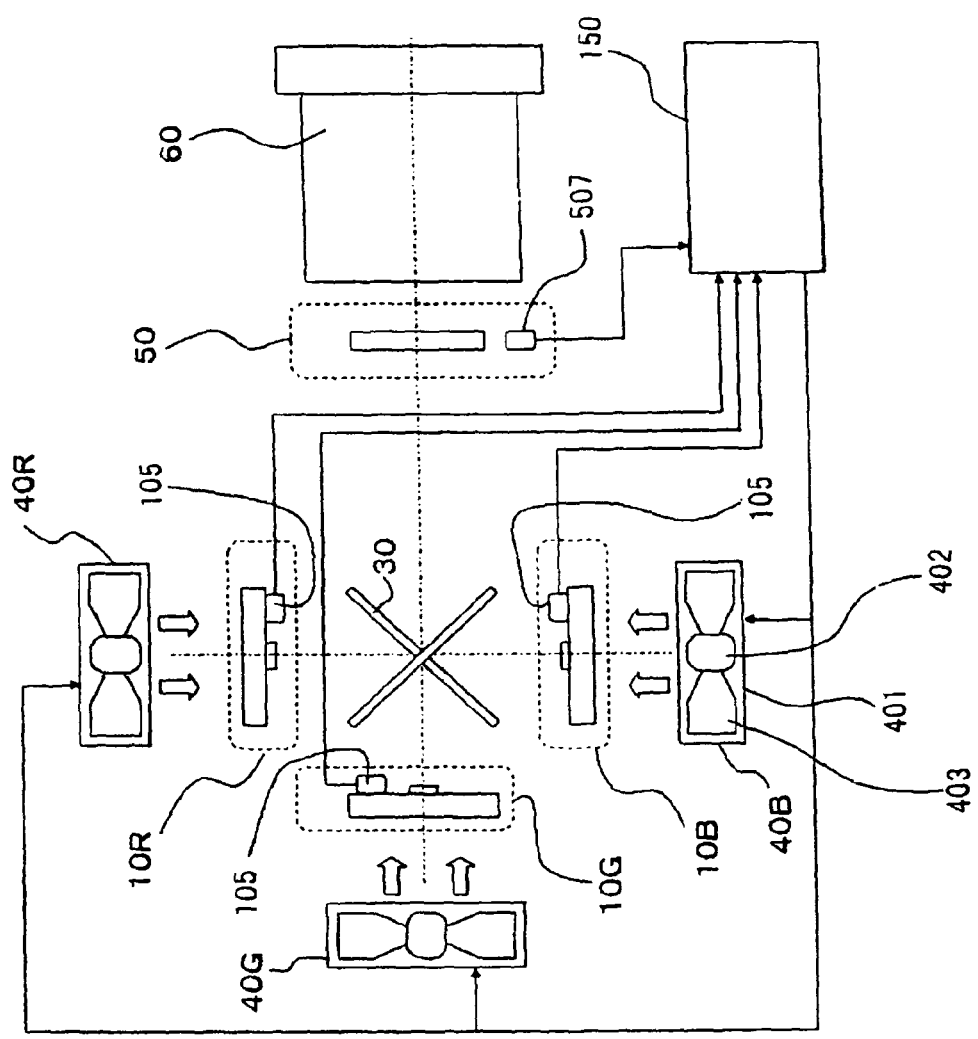
FIG. 2 is a schematic plan view of the optical unit in FIG. 1.

Now, an exemplary embodiment of a projection display device will be described. FIG. 1 is a schematic perspective view of an optical unit included in a projection display device of the exemplary embodiment, and FIG. 2 is a schematic plan view thereof. The shown optical unit is housed in an unshown casing. The casing also houses components such as a power circuit and an input/output interface besides the optical unit in FIGS. 1 and 2. The present invention has a feature in a structure of the optical unit, and thus descriptions of the components other than the optical unit will be omitted.

The optical unit includes light source device 10R that emits a red light, light source device 10G that emits a green light, light source device 10B that emits a blue light, and cross dichroic mirror 30 that combines the three color lights emitted from light source devices 10R, 10G and 10B. In the description below, light source devices 10R, 10G and 10B are generally referred to as "light source device 10" in some cases.

Lenses 20R, 20G and 20B are provided between light source devices 10R, 10G and 10B and cross dichroic mirror 30. The optical unit further includes condenser lens 21, cooling fans 40R, 40G and 40B, optical modulation device 50, projection lens 60, and metal plate 70. In the description below, lenses 20R, 20G and 20B are generally referred to as "lens 20" and cooling fans 40R, 40G and 40B are generally referred to as "cooling fan 40" in some cases.

As is clearly shown in FIGS. 1 and 2, light source device 10, lens 20, cross dichroic mirror 30, condenser lens 21, cooling fan 40, optical modulation device 50, and projection lens 60 are all mounted on metal plate 70. In other words, metal plate 70 is a common support member of the components of the optical unit.

Light source device 10R and the lens 20R are aligned so that optical axes thereof match with each other. Similarly, light source device 10G and lens 20G are aligned so that optical axes thereof match with each other. Light source device 10B and lens 20B are aligned so that optical axes thereof match with each other.

Light source device 10R and light source device 10B are opposite each other with cross dichroic mirror 30 therebetween. Light source device 10G and condenser lens 21 are opposite each other with cross dichroic mirror 30 therebetween. Light source device 10R and light source device 10B are aligned so that optical axes thereof match with an unshown line X passing through the center of cross dichroic mirror 30. Light source device 10G is aligned so that an optical axis thereof matches with unshown line Y. Lines X and Y cross each other at the center of cross dichroic mirror 30.

Cross dichroic mirror 30 matches traveling directions of the lights emitted from light source device 10. Specifically, the lights emitted from light source devices 10R and 10B are reflected by cross dichroic mirror 30, and the traveling directions thereof are changed 90 degrees. The light emitted from light source device 10G passes directly through cross dichroic mirror 30. Specifically, the traveling direction of the light emitted from light source device 10G is not changed. As such, the traveling directions of the lights emitted from light source devices 10R, 10G and 10B are matched.

Condenser lens 21 guides the light emitted from cross dichroic mirror 30 to optical modulation device 50. Optical modulation device 50 modulates the incident light on the basis of image information to form an optical image. Projection lens 60 enlarges and projects the optical image formed by optical modulation device 50 onto an unshown screen.

Cooling fans 40R, 40G and 40B are placed behind light source devices 10R, 10G and 10B, respectively, and cool corresponding light source device 10.

Figure 3:
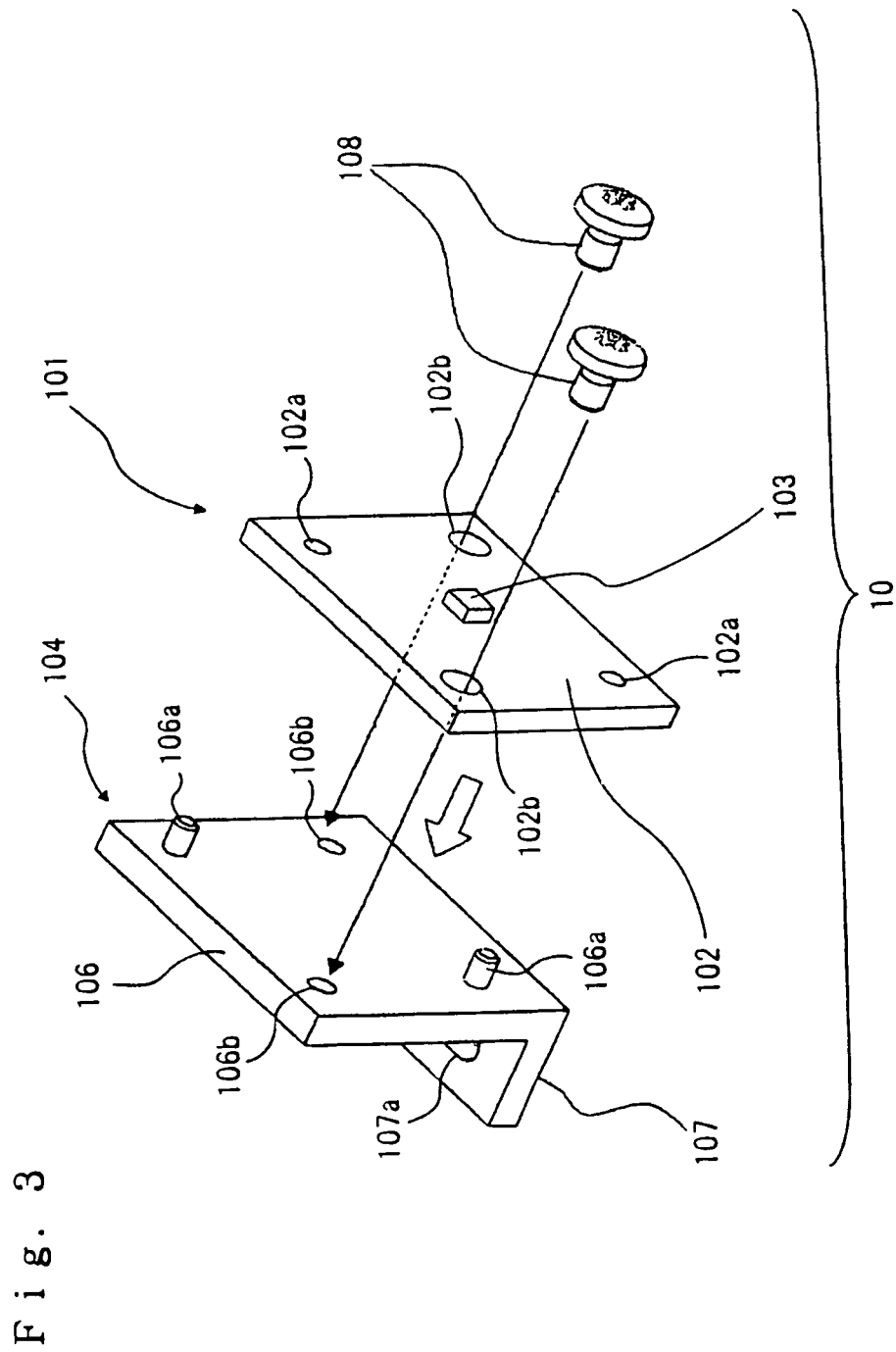
FIG. 3 is an exploded perspective view of a light source device in FIG. 1.

The above is the outline of the optical unit. First, a structure of light source device 10 will be specifically described mainly with reference to FIG. 3. Light source device 10 includes light source 101 and holder 104 to which light source 101 is secured. Light source 101 includes rectangular substrate 102, light emitting element (light emitting diode 103) placed on the center of a surface of substrate 102, and temperature sensor 105 (FIG. 2) placed near light emitting diode 103. Positioning holes 102a are formed at two diagonally opposite corners of substrate 102, and holes 102b are formed at the other two diagonally opposite corners. The output of temperature sensor 105 is input to controller 150 in FIG. 2. Light emitting diode 103 included in light source device 10R is a red light emitting diode, light emitting diode 103 included in light source device 10G is a green light emitting diode, and light emitting diode 103 included in light source device 10B is a blue light emitting diode.

Holder 104 includes retainer 106 to which substrate 102 of light source 101 is secured, and bottom 107 extending perpendicularly to retainer 106. Protrusions 106a are formed at two diagonally opposite corners of retainer 106, and screw holes 106b are formed at the other two diagonally opposite corners. Substrate 102 is positioned on holder 104 by protrusion 106a on holder 104 that is inserted into positioning hole 102a in substrate 102. Substrate 102 is secured to holder 104 by screw 108 that is threaded into screw hole 106b through hole 102b in substrate 102. The entire back surface of substrate 102 is in close contact with the opposite front surface of retainer 106. Grease is allowed to be applied or a heat conductive sheet is provided between the back surface of substrate 102 and the front surface of retainer 106 to increase heat conductivity from substrate 102 to holder 104. The heat conductive sheet is made of, for example, silicon or graphite.

Figure 5:
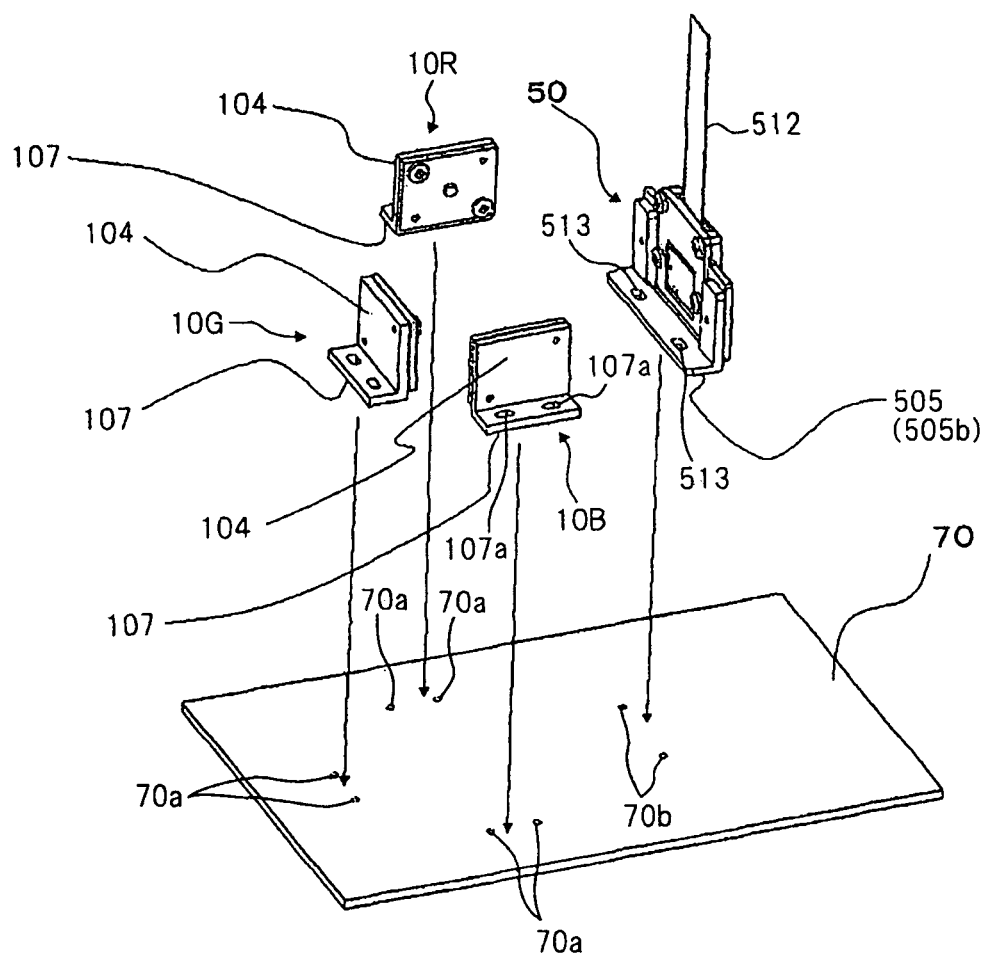
FIG. 5 is an exploded perspective view of the light source device and the optical modulator mounted to a metal plate.

Substrate 102 and holder 104 are made of metal having high heat conductivity, for example, aluminum (Al) or copper (Cu). Thus, heat generated from light emitting diode 103 is quickly diffused to the entire substrate. The heat diffused to substrate 102 is transferred from the back surface of the substrate to holder 104, and from holder 104 to metal plate 70 (FIG. 1) on which holder 104 is secured. As shown in FIG. 5, two securing holes 107a are formed in bottom 107 of holder 104. Holder 104 is secured to metal plate 70 by a screw (not shown) that passes through each securing hole 107a and that is threaded into screw hole 70a formed in metal plate 70. Specifically, the heat generated from light emitting diode 103 is transferred to metal plate 70 that is a common support member of the light source unit. It is clear from the drawing that the surface having the largest area of bottom 107 of holder 104 is in close contact with metal plate 70. Securing hole 107a formed in bottom 107 of holder 104 is a slot that has a long diameter in a direction perpendicular to an optical axis of the light emitted from light source device 10. Thus, the position of light source device 10 that is secured to metal plate 70 can be changed to match the optical axes of light source device 10 and lens 20.

Next, cooling fan 40 will be described with reference to FIGS. 1 and 2. Cooling fan 40 is an axial fan including case 401 having inlet 401a and an outlet (not shown), electric motor 402 housed in case 401, and a plurality of blade plates 403 mounted to a rotating shaft of electric motor 402. Cooling fan 40 is placed behind light source device 10 as described above. More specifically, cooling fan 40 is placed so that the outlet faces a rear surface of retainer 106 of holder 104. The ON/OFF made of electric motors 402 of cooling fans 40R, 40G and 40B is individually or collectively controlled by controller 150.

Figure 4:
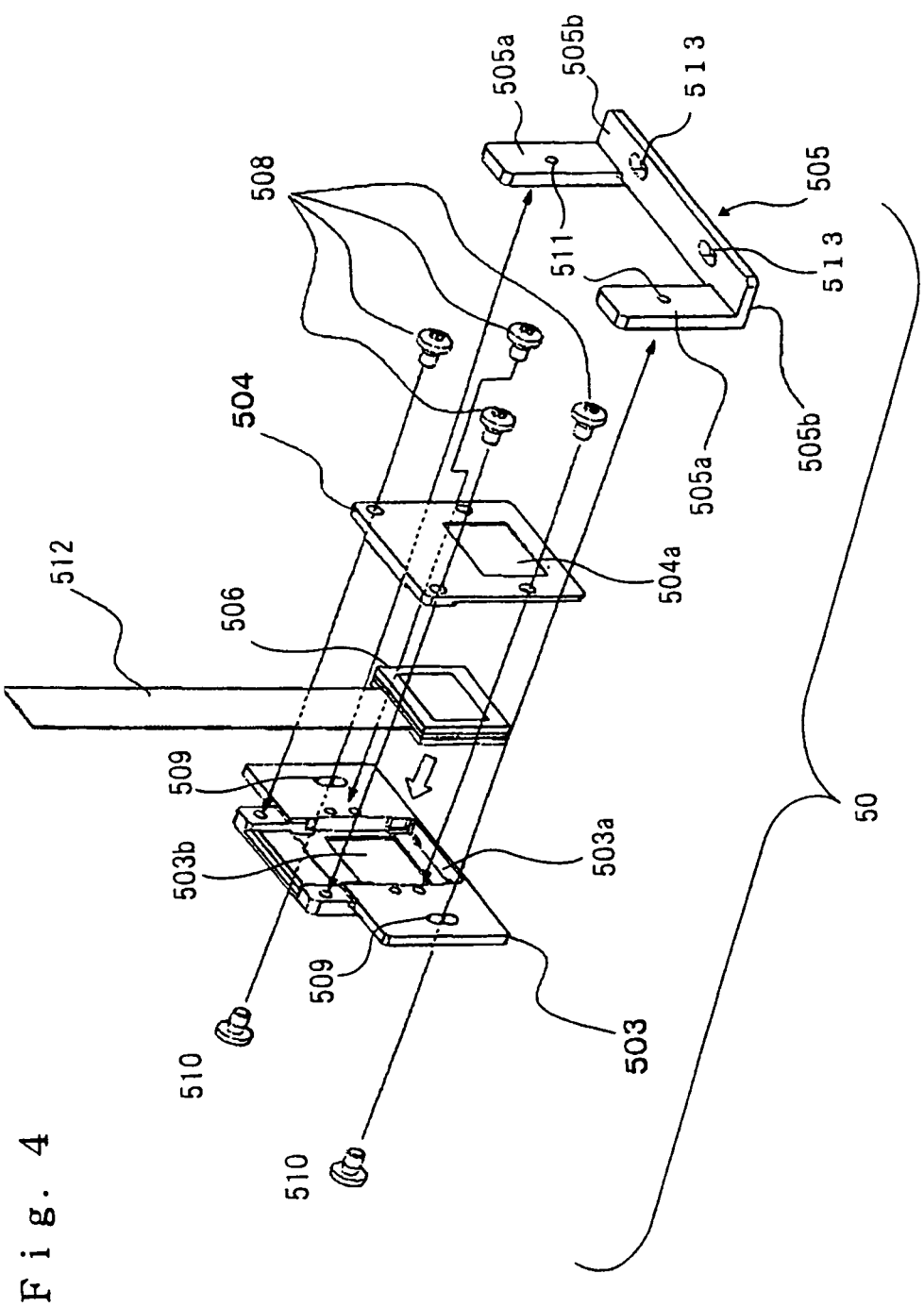
FIG. 4 is an exploded perspective view of an optical modulator in FIG. 1.

Next, a structure of optical modulation device 50 will be specifically described mainly with reference to FIG. 4. Optical modulation device 50 includes panel case 503, panel cover 504, panel holder 505, transmissive liquid crystal panel 506, and temperature sensor 507 (FIG. 2) placed near liquid crystal panel 506. Panel case 503 has recessed receiver 503a. Liquid crystal panel 506 is received in receiver 503a. Liquid crystal panel 506 that is received in receiver 503a is covered with panel cover 504, and panel cover 504 is secured to panel case 503 by screw 508. Specifically, liquid crystal panel 506 is held between panel case 503 and panel cover 504. More specifically, panel cover 504 has incident window 504a through which light for illuminating liquid crystal panel 506 is incident. Receiver 503a of panel case 503 has emission window 503b through which light having passed through liquid crystal panel 506 is emitted. Four sides of liquid crystal panel 506 are held between a perimeter of incident window 504a and a perimeter of emission window 503b. Temperature sensor 507 is placed near incident window 504a of panel cover 504. The output of temperature sensor 507 is input to controller 150 (FIG. 2). Temperature sensor 507 may be placed on panel case 503.

Panel holder 505 includes a pair of parallel legs 505a and connector 505b connecting lower ends of legs 505a. Legs 505a are secured to panel case 503. A surface having the largest area of each leg 505a is in close contact with panel case 503. Specifically, legs 505a are firmly secured to regions extending outwardly on opposite sides of receiver 503a on a surface of the panel case. More specifically, through hole 509 that passes through panel case 503 is formed in each of the regions, and screw 510 that passes through through hole 509 is threaded into screw hole 511 that is formed in leg 505a. Reference numeral 512 in the drawing denotes a flexible wiring substrate connected to liquid crystal panel 506.

Optical modulation device 50 having the above described structure is secured to metal plate 70. Specifically, as shown in FIGS. 1 and 5, a screw (not shown) that passes through through hole 513 that is formed in connector 505b of panel holder 505 is threaded into screw hole 70b formed in metal plate 70.

Panel case 503, panel cover 504, and panel holder 505 are made of metal having high heat conductivity, for example, aluminum (Al) or copper (Cu). Thus, heat of metal plate 70 is transferred to panel holder 505. The heat transferred to panel holder 505 is quickly diffused to the whole of holder 505, panel case 503, and panel cover 504, and transferred to liquid crystal panel 506. It is clear from the drawing that the surface that has the largest area of connector 505b of panel holder 505 is in close contact with metal plate 70.

Through hole 509 in panel case 503 and through hole 513 in panel holder 505 are slots. Also, the long diameter direction of through hole 509 is perpendicular to the long diameter direction of through hole 513. Thus, the position of liquid crystal panel 506 secured to metal plate 70 can be changed vertically and horizontally to align the center of liquid crystal panel 506 and the optical axis of an illumination optical system. Also, the center of liquid crystal panel 506 and an optical axis of projection lens 60 can be aligned.

As described above, light source device 10 (light source 101) and optical modulation device 50 (liquid crystal panel 506) are mounted on common metal plate 70. The heat generated from light source 101 is transferred to metal plate 70, and the heat of metal plate 70 is transferred to liquid crystal panel 506. Specifically, light source 101 and liquid crystal panel 506 are thermally connected via common metal plate 70.

Further, controller 150 that controls cooler 40 constantly or regularly monitors temperatures of both light source 101 and liquid crystal panel 506. Controller 150 switches the ON/OFF made of cooling fan 40 on the basis of the monitoring results. Specifically, when the temperature of liquid crystal panel 506 is lower than the reference temperature (the lower limit value of the operating temperature range of liquid crystal panel 506), cooling fan 40 is stopped (OFF). Then, the heat generated from light source 101 heats liquid crystal panel 506 to increase the temperature of liquid crystal panel 506 to the reference temperature or higher. Specifically, when the temperature of liquid crystal panel 506 is lower than the operating temperature range, light source 101 functions as a heat source for heating liquid crystal panel 506. When cooling fan 40 is stopped, the temperature of light source 101 is increased, but heat for the temperature increase is used for heating liquid crystal panel 506, and thus the temperature of light source 101 does not exceed the predetermined range. If the temperature of liquid crystal panel 506 is low enough so that it is lower than the operating temperature range, the temperature of light source 101 does not exceed the predetermined range even if cooling fan 40 is temporarily stopped.

Controller 150 controls cooling fan 40 on the basis of the temperature of light source 101 when the temperature of liquid crystal panel 506 is the reference temperature or higher. Specifically, controller 150 operates (ON) cooling fan 40 as required so that the temperature of light source 101 does not exceed the predetermined range. Controller 150 stops (OFF) cooling fan 40 when the temperature of liquid crystal panel 506 again becomes lower than the reference temperature.

The projection display device of the exemplary embodiment includes three cooling fans 40, and the operating states of cooling fans 40 need not be simultaneously switched. Specifically, the operating states of the plurality of cooling fans may be individually controlled to operate a part of the cooling fans and to stop the other part of the cooling fans. The reference temperature may be set to a temperature higher or lower than the lower limit value of the operating temperature range of liquid crystal panel 506. For example with a view to a margin of safety, a temperature that is slightly higher than the lower limit value of the operating temperature range of liquid crystal panel 506 may be set as the reference temperature.

The exemplary embodiment has been described, but the scope of the present invention is not limited to the exemplary embodiment. For example, the light emitting diode as the light source may be replaced by a semiconductor laser. The light source may be replaced by a high pressure discharge lamp. The optical element for combining the lights emitted from the plurality of light sources may be replaced by a cross dichroic prism (XDP).

The common support member on which the light source and the optical modulator are mounted is desirably made of material having high heat conductivity, but is not restrictively made of metal. Similarly, the member provided between the light source and the support member and the member provided between the optical modulator and the support member are desirably made of material having high heat conductivity, but are not restrictively made of metal.

The axial fan as the cooling means may be replaced by a sirocco fan, a heat sink, or a Peltier device. A cooling method is not limited to air cooling, but may be liquid cooling or the like.

The support member of the present invention includes all support members in which two or more members are integrated and thermally connected.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A projection display device that modulates light on a basis of image information to form an optical image, and projects the formed optical image, comprising:
    a light source;
    an optical modulator that modulates light emitted from said light source;
    a cooling unit configured to cool said light source;
    a first temperature sensor that measures a temperature of said light source;
    a second temperature sensor that measures a temperature of said optical modulator;
    a controller that controls said cooling unit; and
    a common support member on which at least said light source and said optical modulator are mounted,
    wherein said light source and said optical modulator are thermally connected via said common support member,
    wherein said optical modulator comprises a panel case, a panel cover, a panel holder which is secured to said panel case, and a liquid crystal panel,
    wherein said panel case has an emission window,
    wherein said panel cover has an incident window,
    wherein four sides of said liquid crystal panel are held between a perimeter of said incident window and a perimeter of said emission window,
    wherein said panel holder is secured to said common support member,
    wherein a heat of said light source is transferred to said optical modulator,
    wherein said controller stops said cooling unit when the temperature of said optical modulator measured by said second temperature sensor becomes lower than a reference temperature, and
    wherein said controller operates said cooling unit based on the temperature of said light source measured by said first temperature sensor when the temperature of the optical modulator measured by said second temperature sensor becomes higher than the reference temperature.

2. A projection display device that modulates light on a basis of image information to form an optical image, and projects the formed optical image, comprising:
    a light source;
    an optical modulator that modulates light emitted from said light source;
    a plurality of cooling units, each one of the plurality of cooling units being configured to cool said light source;
    a first temperature sensor that measures a temperature of said light source;
    a second temperature sensor that measures a temperature of said optical modulator;
    a controller that controls said plurality of cooling units; and
    a common support member on which at least said light source and said optical modulator are mounted,
    wherein said light source and said optical modulator are thermally connected via said common support member,
    wherein said optical modulator comprises a panel case, a panel cover, a panel holder which is secured to said panel case, and a liquid crystal panel,
    wherein said panel case has an emission window,
    wherein said panel cover has an incident window,
    wherein four sides of said liquid crystal panel are held between a perimeter of said incident window and a perimeter of said emission window,
    wherein said panel holder is secured to said common support member,
    wherein said controller stops at least one of said plurality of cooling units when the temperature of said optical modulator measured by said second temperature sensor becomes lower than a reference temperature, and
    wherein said controller operates said plurality of cooling units based on the temperature of said light source measured by said first temperature sensor when the temperature of the optical modulator measured by said second temperature sensor becomes higher than the reference temperature.

3. The projection display device according to claim 1, further comprising:
    two or more light sources that each emit a different color of light; and
    an optical element that combines the lights emitted from the two or more light sources.

4. The projection display device according to claim 2, further comprising:
    two or more light sources that each emit a different color of light; and
    an optical element that combines the lights emitted from the two or more light sources.

5. The projection display device according to claim 1, wherein said common support member comprises a metal panel.

6. The projection display device according to claim 2, wherein said common support member comprises a metal panel.

7. The projection display device according to claim 1, wherein said light source comprises a light emitting element.

8. The projection display device according to claim 2, wherein said light source comprises a light emitting element.

9. A projection display device that modulates light on a basis of image information to form an optical image, and projects the formed optical image, comprising:
    a light source;
    an optical modulator that modulates light emitted from said light source;
    a cooling unit for cooling said light source;
    a first temperature sensing unit for measuring a temperature of said light source;
    a second temperature sensing unit for measuring a temperature of said optical modulator;
    a controller for controlling said cooling unit; and
    a common support member on which at least said light source and said optical modulator are mounted,
    wherein said optical modulator comprises a panel case, a panel cover, a panel holder which is secured to said panel case, and a liquid crystal panel,
    wherein said panel case has an emission window,
    wherein said panel cover has an incident window,
    wherein four sides of said liquid crystal panel are held between a perimeter of said incident window and a perimeter of said emission window,
    wherein said panel holder is secured to said common support member, wherein said light source and said optical modulator are thermally connected via said common support member, and wherein said control unit stops said cooling unit when the temperature of said optical modulator measured by said second temperature sensing unit becomes lower than a reference temperature.

10. The projection display device according to claim 1, wherein said light source comprises:
   a holder;
   a substrate secured to the holder, an entire back surface of the substrate being in close contact with an entire front surface of the holder; and
   a light-emitting element secured to the substrate.

11. The projection display device according to claim 10, further comprising one of a heat conductive sheet and a grease positioned between the holder and the substrate.

12. The projection display device according to claim 10, wherein the holder and the substrate each comprise a material having a high heat conductivity.

13. The projection display device according to claim 10, wherein the holder comprises:
   a retainer portion, the retainer portion contacting the entire back surface of the substrate; and
   a bottom area, the bottom area extending perpendicularly from the retainer portion, and the bottom area being in close contact with the common support member.

14. The projection display device according to claim 10, wherein said cooling unit comprises a sirocco fan.

15. The projection display device according to claim 1, wherein an entire back surface of the common support member is in close contact with an opposite front surface of said light source.

* * * * *